US006249070B1

United States Patent
Sharp

(10) Patent No.: US 6,249,070 B1
(45) Date of Patent: Jun. 19, 2001

(54) ROTATING ASSEMBLY AND SUPPORT THEREFOR

(75) Inventor: John Sharp, Mahlow (DE)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/415,462

(22) Filed: Oct. 14, 1999

(30) Foreign Application Priority Data

Oct. 16, 1998  (GB) .................................... 9822638

(51) Int. Cl.$^7$ .............................. H02K 7/09; H02K 7/10; H02K 1/00; H02K 3/00; H02K 19/26
(52) U.S. Cl. ..................... 310/90.5; 310/75 D; 310/192
(58) Field of Search .................. 310/90.5, 75 D, 310/231, 192, 90, 75 R, 66, 180, 179

(56) References Cited

U.S. PATENT DOCUMENTS

| | | | |
|---|---|---|---|
| 3,216,542 | * | 11/1965 | Comstock ........................ 192/21.5 |
| 3,602,746 | * | 8/1971 | Clair ........................................ 310/55 |
| 4,197,474 | * | 4/1980 | Honigsbaum ....................... 310/104 |
| 4,375,047 | * | 2/1983 | Nelson et al. ......................... 318/48 |
| 4,597,613 | * | 7/1986 | Sudo ................................... 310/90.5 |
| 5,078,741 | * | 1/1992 | Bramm et al. ...................... 623/3.14 |
| 5,270,600 | * | 12/1993 | Hashimoto ........................ 310/75 D |
| 5,292,284 | * | 3/1994 | Denk et al. ............................. 464/29 |
| 5,376,862 | * | 12/1994 | Stevens ............................. 310/75 D |
| 5,856,719 | * | 1/1999 | Armas ................................. 310/103 |
| 5,867,979 | * | 2/1999 | Newton et al. ..................... 60/226.1 |
| 5,961,301 | * | 10/1999 | Wasserman et al. ................ 417/420 |

* cited by examiner

Primary Examiner—Nestor Ramirez
Assistant Examiner—Guillermo Perez
(74) Attorney, Agent, or Firm—Oliff & Berridge, PLC

(57) ABSTRACT

A shaft (14) is formed with a magnetically transparent portion within its length, so as to enable passage therethrough of electromagnetic flux from stator poles, to a further shaft (20) to cause shaft (20) to move to a position in space, coaxial with the shaft (20).

9 Claims, 1 Drawing Sheet

ROTATING ASSEMBLY AND SUPPORT THEREFOR

The present invention relates to a rotating assembly and in particular to an assembly in which rotating components are supported one from another.

It is common practice to support rotating components, such as shafts, in spaced relationship by ball or roller bearings. However, this necessitates the use of lubrication with its attendant need for complicated flow path structure and seals. It is known to support a single component in space for the purpose of rotation, by use of the stator and rotor principle. Wire wound stator poles surround a magnetically permeable component and by passing electrical currents through the wires electromagnetic forces are generated which cause the component to move to a position in space, equidistant from the end faces of the poles. The component is then rotated by other power means and the need for lubrication is obviated.

The present invention seeks to provide a rotating assembly in which one component is supported from another by means other than solid, lubricated bearings.

According to the present invention an assembly comprises components capable of relative rotational movement and including electrical stator means for electromagnetically supporting said components for rotation, wherein one of said components has a low or non magnetically permeable insert portion and electrical stator means is positioned with respect thereto, to pass electromagnetic flux through said insert portion to support another component.

Figure 1:
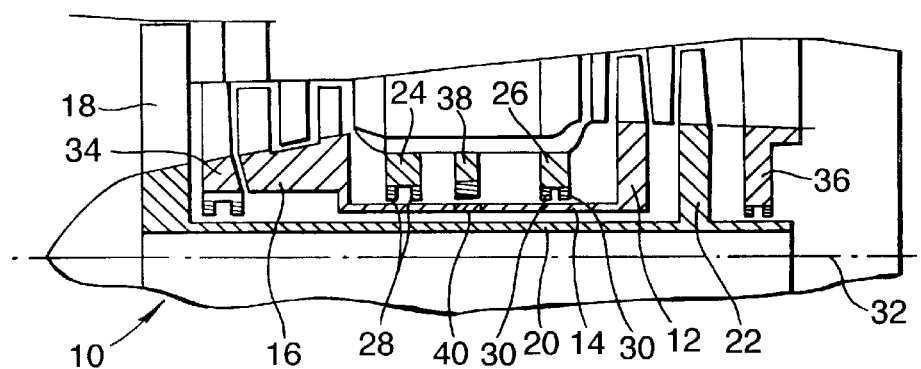
Figure 2:
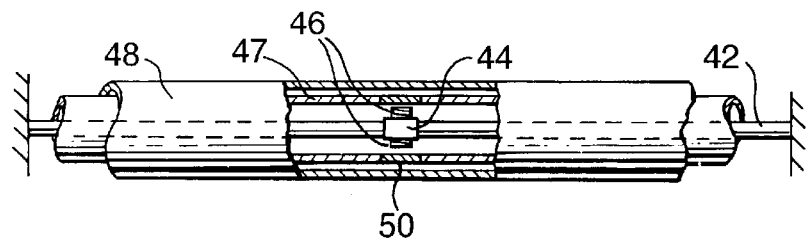
Figure 3:
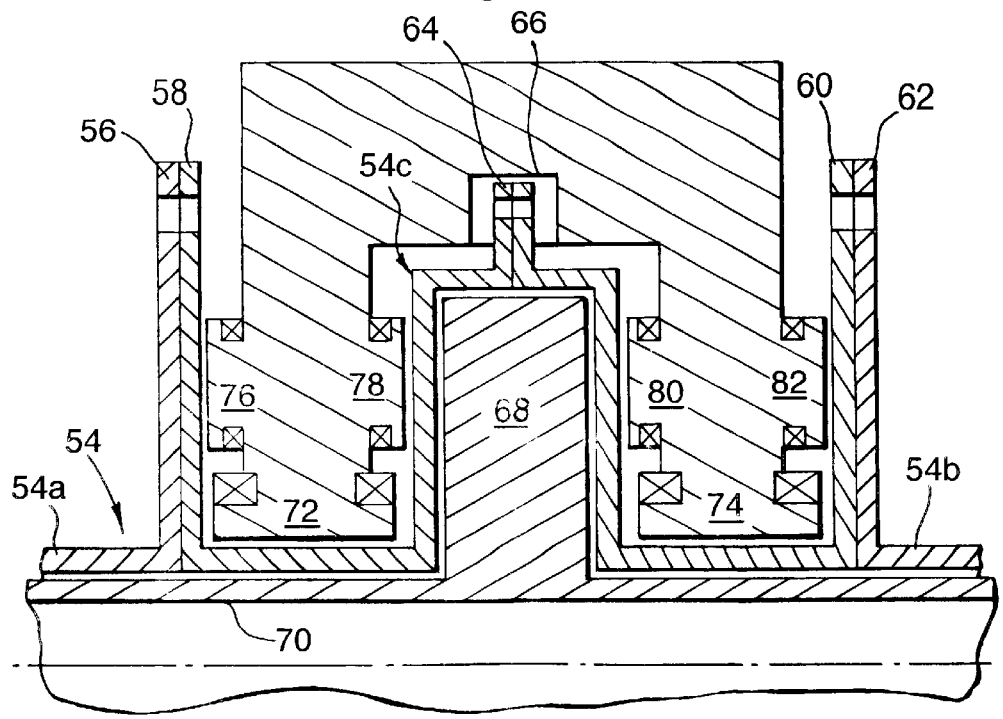

The invention will now be described, by way of example and with reference to the accompanying drawings in which:

FIG. 1 is a diagrammatic view of a pair of rotating shafts in accordance with the present invention in a working environment, namely, a ducted fan gas turbine engine, FIG. 2 shows an alternative arrangement of rotating shafts and stators in accordance with the present invention, FIG. 3 illustrates an alternative form of low or non magnetically permeable shaft portion to those depicted in FIGS. 1 and 2.

Referring to FIG. 1 a ducted fan gas turbine engine 10 has a high pressure turbine stage 12 connected via a hollow shaft 14, to a high pressure compressor section 16, in known manner. The engine 10 also has a front fan stage 18 connected via a further hollow shaft 20, to a low pressure turbine stage 22, also in known manner. During operation of the engine 10, shafts 14 and 20 rotate coaxially.

In order to achieve the desired rotation, shaft 14 is surrounded by electrical stator mechanisms 24 and 26 which are spaced from each other axially of the shaft 14. During operation of the engine 10 the shaft 14 acts as the rotor of a stator/rotor device. Prior to start up of the engine 10 an electrical current from a power source (not shown) on the engine 10 is applied to the wire windings of circular arrays of poles 28 and 30 on stators 24,26 respectively, so as to generate an electromagnetic force which acts on shaft 14, and causes it to adopt a position in space wherein its longitudinal axis coincides with the desired axis of rotation 32.

Shaft 20 is also supportable for rotation, by stators 34,36 at respective ends thereof which are electrically activated at the same time as stators 24,26. Thus shaft 20 is also caused to adopt a position coaxial with the axis of rotation 32.

Shaft 20 is longer than shaft 14, and a further stator 38 is provided about its mid length, externally of the shaft 14, to be activated simultaneously with stators 24,26,34 and 36. In order that, on energising the pole windings of stator 38, the resulting electromagnetic force can act upon shaft 20, a short length of material 40 having very low, or, preferably no magnetic permeability characteristics, is inserted in shaft 14, through which the forces pass to act on and centralise shaft 20 as described hereinbefore.

As well as being permeable to electromagnetic forces, the insert portion 40 must also possess characteristics appropriate to the environment in which it is required to work. Where that environment is in the structure and operation of a gas turbine engine as in the present example, a suitable alloy is one comprising 6% Mn; 16% Ni; remainder steel.

Shaft portion 40 can be joined to shaft 14 by a suitable method eg fusion bonding, welding or by providing the parts with flanges, via which they may be bolted together, as in FIG. 3 which is described later in this specification. Referring now to FIG. 2 a rod 42 is earthed at each end and carries a stator 44 at its mid point. The poles 46 of the stator 44 are equi-angularly spaced around the rod 42 such that their end extremities face the inner wall surface of a shaft 47 through which rod 42 extends. The shaft 47 is nested within a further shaft 48, for co-rotation therewith, in coaxial relationship. Shaft 47 includes a portion 50 which has low or preferably no electromagnetic permeability and stator 44 is aligned with it, so as to enable electromagnetic forces, when generated at the stator poles 46, to pass therethrough and cause shaft 48 to adopt a position coaxial with shaft 47. The two shafts 47,48 can then be rotated by any suitable means, which could include the rotating parts of a gas turbine engine. Clearly to ensure achievement of axial coincidence over the full length of the shaft assembly, at least two further stators 44 will be needed (but not shown), one near each end of shaft 47, where it is still covered by shaft 48.

Referring now to FIG. 3 an outer shaft 54 is constructed from magnetically permeable material portions 54a, 54b and a low or preferably non magnetically permeable material portion 54c. All of the portions have respective flanges 56,58,60 and 62 by means of which they may be joined by bolting. Portion 54c has further flanges 64,66 by virtue of being made from two pieces so as to enable assembly over a collar 68 on an inner shaft 70, which is made entirely from magnetically permeable material.

A stator having six sets of poles is positioned between the flanges 58 and 60, with their pole end extremities adjacent respective surfaces of shaft portion 54c. Poles 72,74 have their axes orientated at 90" to the common axis of rotation 32 of the shafts 54 and 70. When their windings are energised the resulting electromagnetic force passes through the magnetically low permeability portion 54c and acts on the inner shaft 70. With respect to the outer shaft 54, whereafter, simultaneous rotation of the shafts is effected by other means.

In some operational environments eg gas turbine engines, axially directed loads are imposed on associated shafts, which loads need to be opposed, so as to, inter alia, prevent or at least reduce rubbing between rotating and fixed structure. To this end poles 76,78,80 and 82 the axes of which are parallel to the shafts axes, may be powered in any suitable sequence, to counter such movement, relative or simultaneous, of the shafts 54 and 70. Thus if shaft 54 moves to the right as viewed in FIG. 3 poles 82 are activated so as to pass an electromagnetic force through flange 60, to act on the flange 62 of outer shaft 54, which will pull shaft 54 back to its original position.

Should inner shaft 70 move to the right as viewed in FIG. 3, poles 78 are energised to generate the force which will pass through the opposing wall portion of low, or non-magnetically permeable shaft portion 54c, and pull inner shaft 70 back to its original position. Movement to the left by either shaft 54,70 would be opposed in the same manner by activation of either or both sets of poles 76 and 78 as appropriate.

Signal generating means (not shown) for effecting the desired shaft centralising and axial displacement could, in simplest form, comprise capacitance probes. On shaft movement occurring these capacitance probes would emit a signal variable in proportion to the magnitude of shaft movement, which signals, would be utilised to activate appropriate stator poles to redress the situation.

Whilst the present invention has been described with reference to nested rotating shafts it will be appreciated by one skilled in the art that it is equally applicable to any assembly in which rotating components are supported one from another.

What is claimed is:

1. A multi-shaft gas turbine engine in which co-axial, relatively rotatable inner and outer shafts drivingly respectively connect a first turbine stage with a first compressor stage and a second turbine stage with a second compressor stage, the co-axial shafts are supported by electromagnetic bearing means, and an assembly for placing an axial thrust on the inner shaft with an electrical stator means for electromagnetically supporting the shafts for rotation, wherein the inner shaft has a radially extending magnetic flange portion and the outer shaft has a low or non-magnetically permeable insert portion shaped to accommodate and disposed concentrically with the magnetic flange portion carried by the inner shaft, and electrical stator means positioned on a relatively fixed part of an engine casing with respect thereto to the flange portion and the non magnetically permeable insert portion, to pass electromagnetic flux through the insert portion to support the inner shaft and to react axial thrust therefrom.

2. An assembly as claimed in claim 1 in which the insert portion is fusion bonded to an associated component.

3. An assembly as claimed in claim 1 in which the insert portion is connected via flanges to an associated component.

4. An assembly as claimed in claim 1 in which the insert portion is formed from an alloy comprising 6% Mn, 16% Ni the remainder being steel.

5. An assembly as claimed in claim 1 in which the components are shafts.

6. An assembly as claimed in claim 1 in which the components are coaxial shafts.

7. An assembly as claimed in claim 6 in which the outer shaft includes the insert portion.

8. An assembly as claimed in claim 6 in which the inner shaft includes the insert portion.

9. An assembly as claimed in claim 1, wherein the assembly is connected between the turbine stage and compressor/fan stage of a gas turbine engine.

* * * * *